United States Patent Office 2,752,361
Patented June 26, 1956

2,752,361

POLY-HALOGEN-CONTAINING ALPHA SUBSTITUTED ALKYLENIC SUCCINIC ACIDS AND ANHYDRIDES

Paul Robitschek, Buffalo, and Claude Thomas Bean, Jr., Niagara Falls, N. Y., assignors to Hooker Electrochemical Company, Niagara Falls, N. Y., a corporation of New York No Drawing. Application September 10, 1952,
Serial No. 308,923

6 Claims. (Cl. 260—346.6)

This invention relates to new halogen-containing polycarboxylic acids and their anhydrides and to methods for manufacturing the same, comprising the diene synthesis of hexachlorocyclopentadiene with alpha substituted alkylenic succinic acids or anhydrides.

It is an object of this invention to make available polyhalogen-containing polycarboxylic acids or anhydrides which when reacted with polyhydric compounds form polyesters which possess a high percentage of halogen and other valuable characteristics. It is a further object of this invention to employ hexahalocyclopentadiene in the preparation of the poly-halogen-containing polycarboxylic acids or anhydrides.

These and related objects are accomplished by the present invention which comprises effecting the diene synthesis of hexachlorocyclopentadiene with alpha substituted alkylenic succinic acids or anhydrides, as represented by itaconic acid or aconitic acid. More particularly, the compounds of this invention may be represented by the product produced in accordance with the following equation:

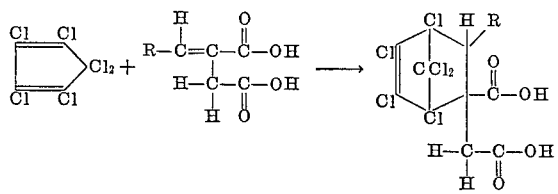

wherein R is the substituted group in the alpha substituted alkylenic succinic acid.

In preparing the compounds of this invention, a solvent may or may not be employed; if used it should be inert with respect to the reactants and reaction products and the boiling point should be high enough to allow for sufficiently rapid reaction at elevated temperatures without necessitating the application of superatmospheric pressure. The reaction temperatures employed are greater than 100 degrees centigrade, and in order to obtain high conversions, are preferably between about 150 and 250 degrees centigrade. The time allowed for reaction will vary with the purity of the reactants, the degree of completion of reaction desired, the solvents employed, etc. The reaction product resulting from the chemical addition reaction is preferably purified in order to obtain a colorless product. Ordinary purification procedures known in the art such as washing adsorbent decolorization, recrystallization, etc. may be satisfactorily employed.

The following examples illustrate the compounds of this invention and methods for their preparation; however, they are not to be construed as limiting except as defined in the appended claims.

Example I

A solution of 900 grams (3.3 moles) of hexachlorocyclopentadiene, 336 grams (3 moles) of itaconic anhydride, 0.336 gram of hydroquinone in 300 milliliters of ortho-dichlorobenzene was heated to a reflux temperature of about 195 degrees centigrade and maintained thereat for a period of approximately twenty-four hours. The reaction was exothermic during the initial period of reaction and some insoluble polymer-like material was formed at these elevated temperatures. At the end of the reaction period the solvent and excess hexachlorocyclopentadiene were removed by distillation in vacuo. The residue was then extracted with monochlorobenzene to separate the insolubles. The monochlorobenzene extract was mixed with ten grams of activated carbon, then filtered hot at a temperature range of about 115 to 190 degrees centigrade; and the resulting filter cake was discarded. The filtrate was cooled to room temperature which caused the precipitation of white crystals. A portion of these crystals was purified by two recrystallizations from glacial acetic acid followed by two recrystallizations from monochlorobenzene. The resulting crystals were dried in vacuo and analyzed for 1,4,5,6,7,7-hexachlorobicyclo-(2.2.1)-5-heptene-2-acetic-2-carboxylic anhydride as follows:

| | Calculated | Found |
|---|---|---|
| Percent total Chlorine | 55.2 | 54.6 |
| Melting Point, degrees centigrade | | 131.0–134.6 |
| Percent anhydride | 100 | 104 |
| Percent yield | 100 | 85 |

In a manner after the foregoing example the following new compound may also be prepared: 1,4,5,6,7,7-hexachloro-3-carboxylic bicyclo (2.2.1)-5-heptene-2-acetic-2-carboxylic acid by the reaction of hexachlorocyclopentadiene with aconitic acid. In like manner, other alpha substituted alkylenic succinic acids may be employed in the diene synthesis with hexachlorocyclopentadiene to make the corresponding adducts embraced within the scope of this invention.

The compounds of this invention are useful as chemical intermediates and in the manufacture of pharmaceuticals, plasticizers, insecticides, and in the preparation of resins.

The following example illustrates a typical use of a compound of this invention in making an infusible, insoluble polyester resin having many valuable and desirable characteristics.

Example 2

Thirteen and two-tenths parts of ethylene glycol and 22.4 parts of diethylene glycol were charged into a resin vessel, and then blanketed with an inert atmosphere, agitated and heated to a temperature of about 100 degrees centigrade, 108 parts of 1,4,5,6,7,7-hexachlorobicyclo-(2.2.1)-5-heptene-2-acetic-2-carboxylic anhydride, prepared in a manner after Example I, and 17.4 parts of maleic anhydride were added to the mixture of glycols and the reactants were heated to 160 degrees centigrade for sixteen hours. A hard brittle resin was obtained. One hundred parts of this resin were compounded with 30 parts of styrene and 0.03 part of hydroquinone to give a viscous solution having a chlorine content of 28 percent and an acid number of 40. The solution, catalyzed with 1 percent of its weight of benzoyl peroxide, cured to a hard tough resin which was immediately self-extinguishing upon removal from an oxidizing flame.

The other compounds of this invention are also useful as intermediates in the preparation of polyester resins similar to that given in the foregoing example. This invention is not to be construed as limited thereto as other uses are contemplated for the compounds of this invention.

We claim:
1. A process which comprises: reacting hexachlorocyclopentadiene with a member of the group consisting of itaconic and aconitic acids, itaconic and aconitic an- hydrides at a temperature between about 150 and 250 degrees centigrade.

2. The process for the preparation of 1,4,5,6,7,7-hexachloro bicyclo-(2.2.1)-5-heptene-2-acetic-2-carboxylic anhydride which comprises reacting hexachlorocyclopentadiene with itaconic anhydride at a temperature between about 150 and 250 degrees centigrade.

3. A hexachlorocyclopentadiene adduct of a member of the group consisting of itaconic and aconitic acids, itaconic and aconitic anhydrides.

4. The compound 1,4,5,6,7,7-hexachloro bicyclo-(2.2.1)-5-heptene-2-acetic-2-carboxylic anhydride.

5. The compound 1,4,5,6,7,7-hexachlorobicyclo-(2.2.1)-5-heptene-2-acetic-2-carboxylic acid.

6. The compound 1,4,5,6,7,7-hexachloro-3-carboxylic bicyclo-(2.2.1)-5-heptene-2-acetic-2-carboxylic acid.

References Cited in the file of this patent

UNITED STATES PATENTS

| | | |
|---|---|---|
| 1,944,731 | Diels et al. | Jan. 23, 1934 |
| 2,606,910 | Herzfeld et al. | Aug. 12, 1952 |

OTHER REFERENCES

Diels et al.: Annalen, 460, pp. 104, 117 (1928).